June 21, 1932.  C. LE BLEU  1,863,861
SCRAPER AND LEVELER
Filed Aug. 10, 1931  4 Sheets-Sheet 1
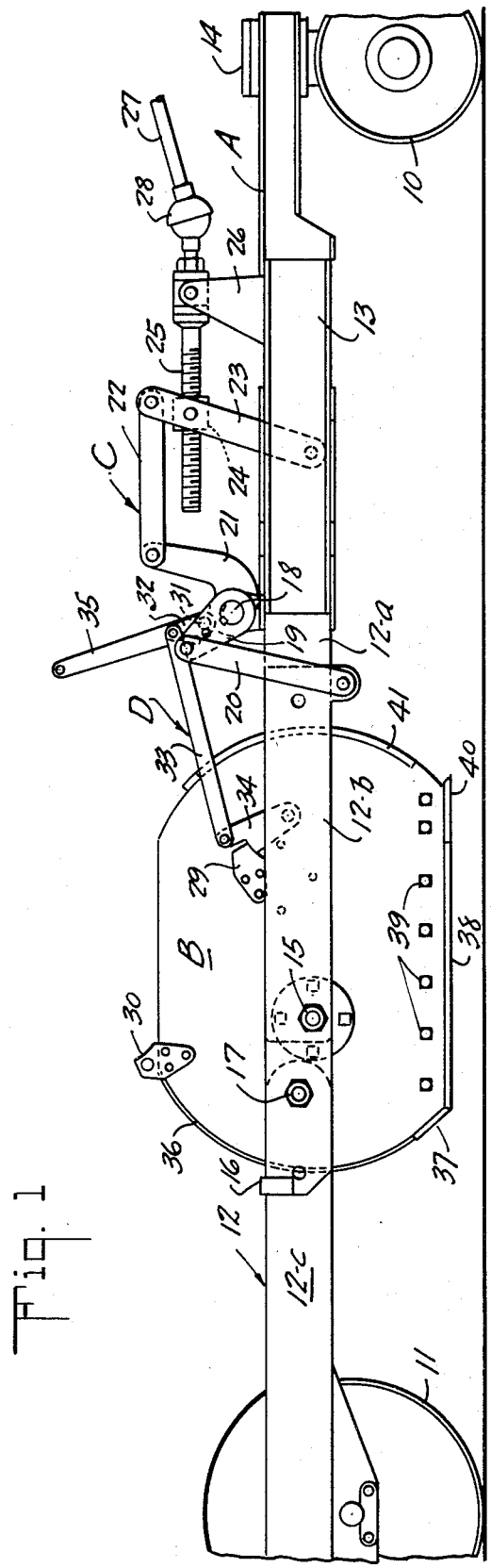
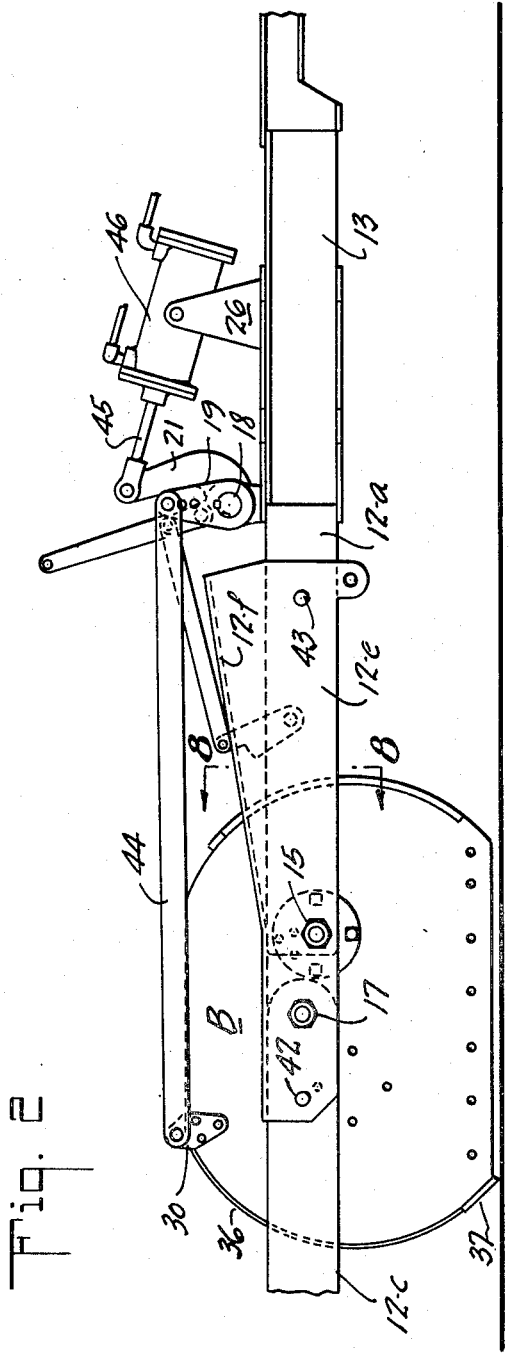
INVENTOR
Charles Le Bleu
BY
Westall and Wallace
ATTORNEYS

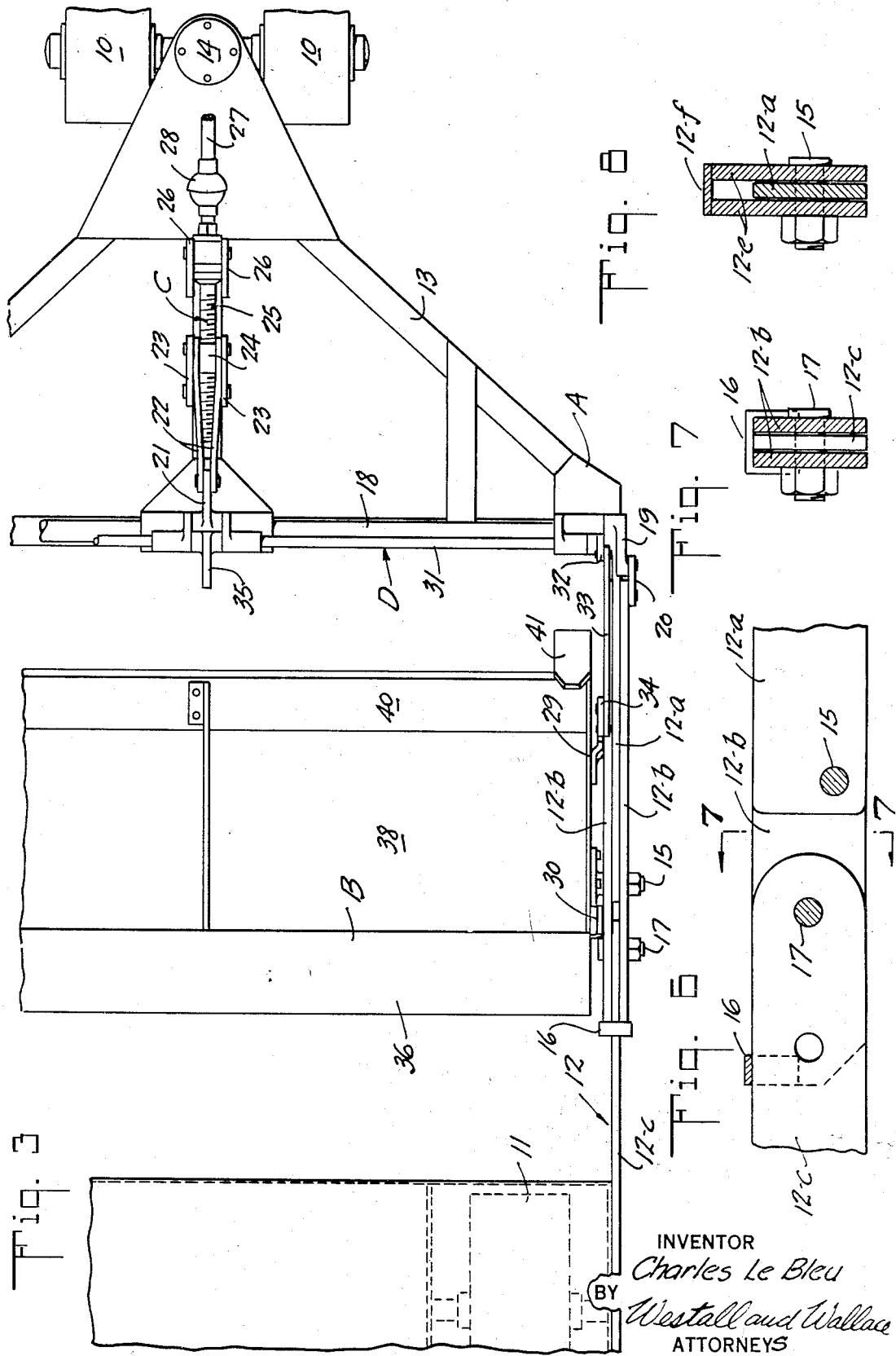

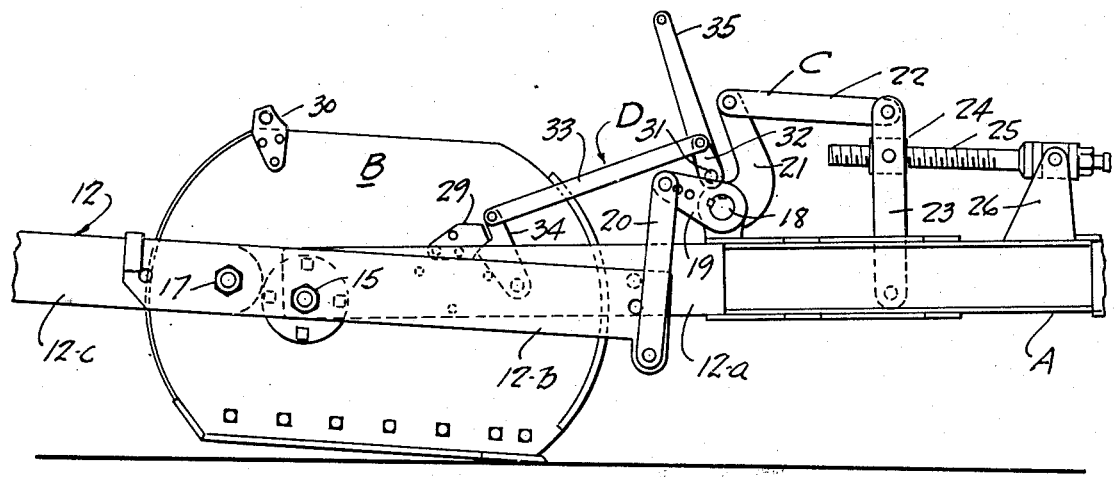
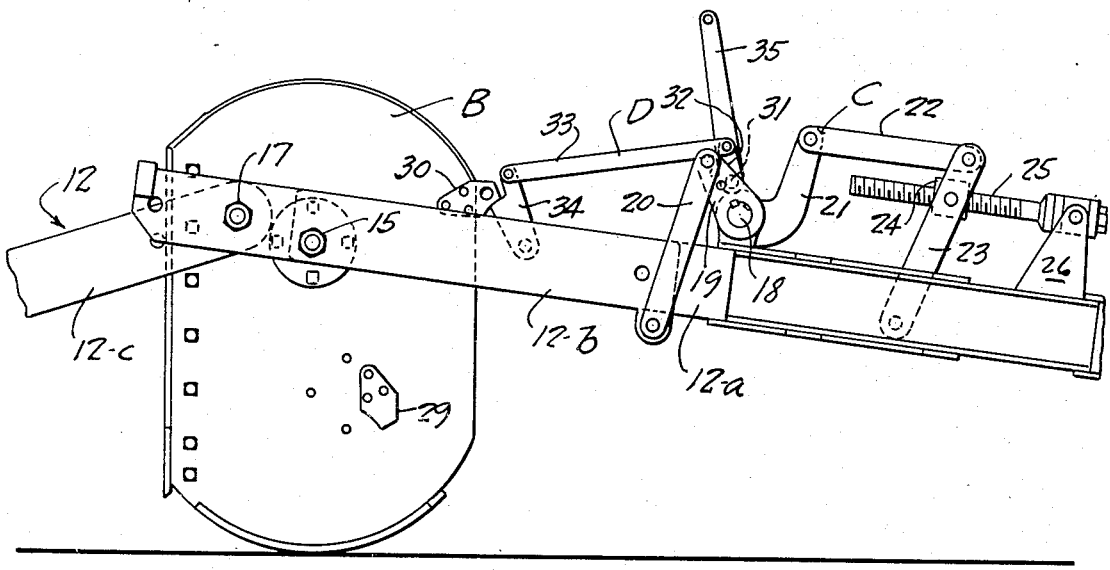

June 21, 1932.　　　C. LE BLEU　　　1,863,861
SCRAPER AND LEVELER
Filed Aug. 10, 1931　　　4 Sheets-Sheet 4
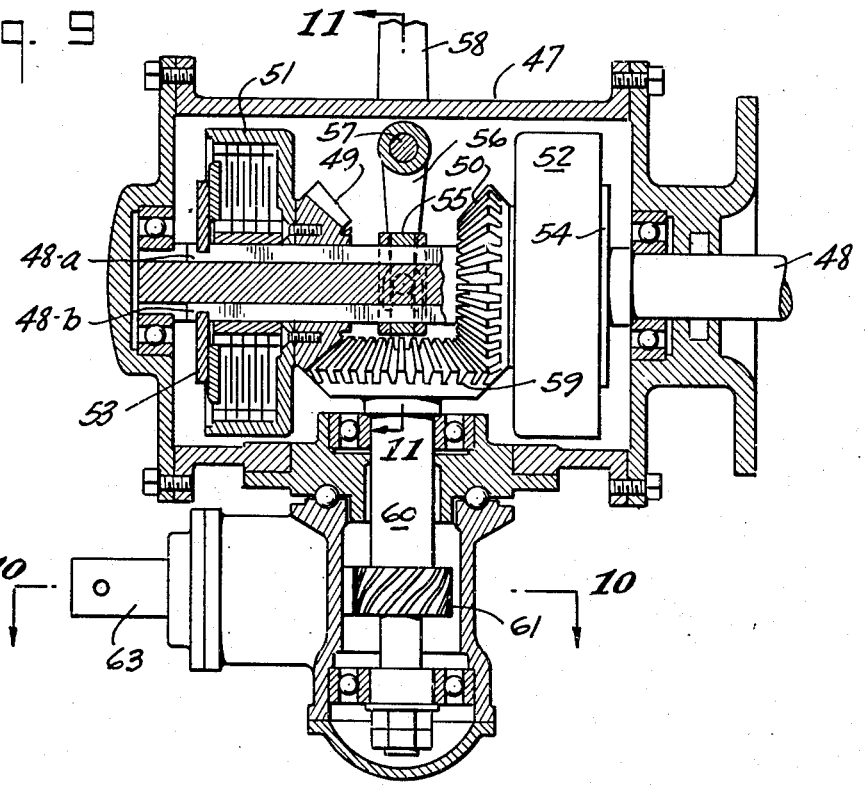
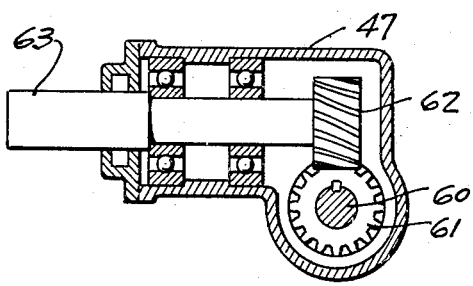
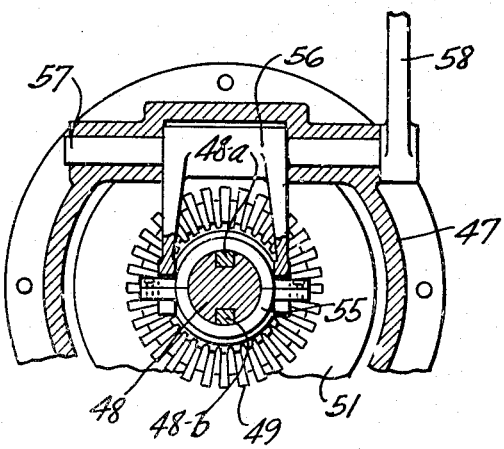
INVENTOR
Charles Le Bleu
BY
Westall and Wallace
ATTORNEYS Patented June 21, 1932

1,863,861

UNITED STATES PATENT OFFICE

CHARLES LE BLEU, OF LOS ANGELES, CALIFORNIA

SCRAPER AND LEVELER

Application filed August 10, 1931. Serial No. 556,057.

This invention relates to a machine for moving dirt and distributing it in desired locations and includes a revoluble pan. It relates to a device used in what is termed "scraper work". Such scraper work may be divided into three classes, namely, short haul, long haul and leveling. A short haul is considered to cover fifty to six hundred feet and a long haul from six hundred feet upward. This has resulted in the development of many different designs of scrapers which fall in one of the three classes because an individual scraper will perform some one of these classes of work more efficiently than others. The result is that a scraper which may be properly classified as a short haul scraper cannot successfully compete with long haul scrapers in long haul work and vice versa. Likewise, a long or a short haul scraper cannot successfully compete with a land leveler in finish or land leveling work. In scraper work, it is usual that on any one job all three classes of work are included. The result is that those engaged in such work must have individual machines for these three classes and a large investment in equipment.

The broad object of this invention is to provide a scraper which is adjustable to perform with equal efficiency all three of the above mentioned classes of work. It is another object of this invention to provide a wheeled scraper having a revoluble bowl in which the wheels are not raised clear of the ground as the bowl revolves from load carrying to spreading position. It is a further object of this invention to provide a scraper having two blades and a removable bottom. It is a still further object of this invention to provide a scraper in which the bowl is lowered or raised and tilted in one operation. Other objects are the provision of power actuated means for controlling the position of the bowl and details of structure.

These objects are obtained by means of the embodiments of my invention illustrated in the accompanying drawings, in which:

Fig. 1 is a side elevation of a scraper having a knuckle frame with the bucket in carrying position; Fig. 2 is a side elevation of a modification with the side bar members of the frame fastened to be rigid; Fig. 3 is a fragmentary plan view of the structure shown in Fig. 1; Fig. 4 is a view similar to Fig. 1 with the bucket in digging position; Fig. 5 is a side view with the bucket in dumping position; Fig. 6 is a fragmentary detail view of a side bar knuckle partly in section; Fig. 7 is a section as seen on the plane designated 7—7 in Fig. 6; Fig. 8 is a section as seen on the plane designated 8—8 in Fig. 2; Fig. 9 is a section through a reversing gear box for operating the bucket control shaft; and Figs. 10 and 11 are sectional views as seen on the lines correspondingly numbered in Fig. 9.

Referring more particularly to Figs. 1 and 3 to 7 inclusive, a supporting frame A carries a revolvuble bucket B. The frame is supported upon front wheels 10 mounted on a truck and rear wheels 11. The front wheels are dirigible and may be secured to the frame in any suitable manner enabling the scraper to be coupled to and follow a tractor. Mechanism to raise and lower the bucket is indicated generally by C. A device to limit the tilting of the bucket is marked D.

Referring more particularly to the frame A, it comprises side bars which have a double knuckle intermediate the front and rear wheels. The side bars are indicated generally by 12 and at the front there are converging members 13 which form bridles. As shown herein, the front wheel truck is connected to the frame by a king pin structure shown conventionally and marked 14. The side bars are counterparts of one another, each comprising a section 12a and a section 12b secured thereto by a pintle 15. The pintle serves as a trunnion for the bucket B. The section 12b is formed of a pair of bars, one on each side of the section 12a, as best shown in Figs. 3 and 7. At the rear end of section 12b is a yoke 16. Secured to the section 12b by means of a pivot pin 17 is a rear section 12c. The yoke 16 forms a rule joint abutment so that the sections 12b and 12c can only break upwardly. Sections 12b have projections on their lower sides for pinning thereto a link.

Mounted in suitable bracket bearings so as to be supported upon the side bar section 12a is a shaft 18. Keyed to the shaft 18 at opposite ends are arms 19 pinned by links 20 to the projections on side bar sections 12b. Keyed to the shaft 18 at its center is a crank arm 21 pivotally connected by a link rod 22 to a rocker 23. The link rod comprises two pieces, placed side by side, and the rocker comprises two bars. Between the bars of rocker 23 is a nut 24 swivelled thereon. Engaged with the rocker is a threaded shaft 25 held by a thrust collar which is swivelled to a bearing bracket 26. Shaft 25 is connected to an operating shaft 27 by a universal joint 28. The operating shaft 27 is preferably power actuated from the tractor and it is obvious that by rotation of the shaft, the rocking of arm 21 may be effected and thereby turning of shaft 18 resulting in determining the angular relation of sections 12a and sections 12b of the frame.

As will be noted from Figs. 1 and 4, the carrying and digging positions of the bucket may be determined by operation of shaft 27. The amount of digging may be made adjustable. However, when the bucket is in digging position as shown in Fig. 4, there would be a tendency of the bucket to turn over into the dumping position shown in Fig. 5 unless restrained. On the side of the bucket are catches 29 and 30. A shaft 31 extends across the frame adjacent the shaft 18 and is mounted in suitable bearings. Fixed to the end of shaft 31 are arms 32 to which are pinned links 33. Pinned to the inner bar of section 12b on each side is a keeper rocker 34 which is pivotally connected at its upper end to link 33. Keepers 34 have shoulders so as to be swung into the path of catches 29 and 30 thereby to arrest clockwise movement of bucket B. To control the position of keeper 34, a handle 35 is secured to the shaft 31. By means of the handle 35, the keepers 34 may be disposed to be engaged by catches or retracted therefrom. In the position shown in Figs. 1 and 4, the keepers 34 engage catches 29 and the level of the bucket is controlled entirely by bending of the frame about the trunnions 15. If the bucket is in digging position as shown in Fig. 4 and the keepers are released, the bucket will turn over and assume dumping position, the keepers being restored to arresting position so as to engage catches 30 as shown in Fig. 5. In this position, the frame control should be operated to aline sections 12a and 12b. By releasing the keepers, the bucket may completely turn over and by restoring the keepers, catches 29 may be engaged and the bucket disposed in either carrying or digging position.

The bucket has a rear arcuate wall 36 with a cutting blade 37 at its lower edge. A removable bottom 38 may be secured to the bucket by bolts 39. At the forward edge of the bottom 38 is a digging blade 40. Shoes 41 are provided at the front of the bucket for riding upon the ground when the bucket is in dumping position.

The device is operable as a leveler, as shown in Fig. 2. The structure of the side bars is modified, in that, the center section of the side bars indicated by 12e is of channel form in cross section as shown in Fig. 8. The web of the channel flares upwardly as shown in Fig. 2 and indicated by 12f. When used as a leveler, the side bars are made rigid by inserting locking pins 42 and 43 in registering apertures in the sections. Bucket B has the trunnion attachment 15 placed further forward. Catches 30 have bolt holes. Links 20 shown in Figs. 1, 4 and 5 are removed and replaced by connecting bars 44 which are pinned to catches 30. Tilting of the bucket B is controlled by movement of the connecting rods 44 effected from arm 21. Handle 35 and its associated parts are inoperative when used as a leveler. Instead of the mechanical nut and threaded shaft construction heretofore described for operation of the arm 21, a hydraulic motor may be provided. Arm 21 is shown connected to a piston rod 45 which is operated by a piston in an oscillating cylinder 46 mounted upon the bearing bracket 26. Suitable pipes are provided for introducing an exhausting fluid from the ends of the cylinder. In the operation of the device as a leveler, the bottom 38 is removed and the blade 37 performs the cutting function.

Where the mechanical screw and nut construction is used, some reversing device must be employed, and in Figs. 9, 10 and 11 I have shown such a device. A housing 47 has journalled therein a shaft 48. Shaft 48 constitutes a drive shaft which may be operated by the tractor engine or any other suitable prime mover. It is provided with diametrically opposite slidable keys 48a and 48b. Idly mounted upon shaft 48 are bevel gears 49 and 50. Multiple plate clutch members 51 and 52 are secured to gears 49 and 50 respectively and are arranged to be acted upon by plates 53 and 54 secured to keys 48a and 48b. Secured to keys 48a and 48b are spaced thrust collars which are slidable axially on shaft 48. A rotatable collar 55 is mounted between the thrust collars and connected to a rocker 56 fixed to a shaft 57 provided with a handle 58. By swinging the handle, one of the plates 53 or 54 will act to clutch the corresponding pinion to shaft 48 and the other plate will act to declutch its pinion. Mounted between and in mesh with pinions 49 and 50 is a bevel pinion 59 secured to a shaft 60. A spiral gear 61 is shown fixed to shaft 60 and meshes with a gear 62 fixed to shaft 63. By the gearing just described, shaft 63 may be caused to rotate in either direction by suitable manipulation of handle 58. Shaft 63 is connected by a suitable coupling to shaft 27 of the scraper. Thus, the threaded shaft 25 may be turned and thereby the lowering or raising of the bucket accomplished.

What I claim is:—

1. A wheeled dirt moving machine comprising a frame supported by wheels at the front and rear, a pan extending transversely of and revolubly supported on said frame intermediate the front and rear wheels, and mechanism to control the position of said pan: said frame comprising three section divided side bars extending longitudinally between said front and rear wheels, a removable bolt securing the middle section of each side bar to an end section, pan trunnion bearings on the middle sections of said bars; a revoluble bowl pan having a curved back with a blade and means to attach a removable bottom with a blade, trunnion members detachably mounted on the side walls for changing the location of the trunnions; and power actuated means on said frame to control the position of said bowl.

2. A wheeled dirt moving machine comprising a frame supported by wheels at the front and rear, a pan extending transversely of and revolubly supported on said frame intermediate the front and rear wheels, and mechanism to control the position of said pan: said frame comprising side bars extending longitudinally between said front and rear wheels, a double knuckle in each bar at said pan, one joint of said knuckle being a stop joint to prevent downward breaking thereof, the middle section of said knuckle having a forward extension; a revoluble bowl pan pivoted on the axis of the other joint; adjusting brace means mounted on other sections of said knuckles and connected to said extensions, power actuated means connected to said brace means to adjust the angle between the middle and said other sections of said knuckle, and a manually operable control to limit roll-over movement of any thereby position said pan.

3. A wheeled dirt moving machine comprising a frame supported by wheels at the front and rear, a pan extending transversely of and revolubly supported on said frame intermediate the front and rear wheels, and mechanism to control the position of said pan: said frame comprising side bars extending longitudinally between said front and rear wheels, a double knuckle in each bar at said pan, the rear joint of each knuckle being a stop joint to prevent downward breaking thereof, the middle section of each of said knuckles having a forward extension; a revoluble bowl pan pivoted on the axes of the front joints to roll over; links connected to said extensions, adjusting bell crank levers pivotally mounted on the front sections of said knuckles and connected to said links, power actuated means connected to arms of said bell crank levers to adjust their positions and thereby the angles between the middle and front sections of said knuckles, and a manually operable control to limit rollover movement of and thereby position of said pan.

4. A wheeled dirt moving machine comprising a frame supported by wheels at the front and rear, a pan extending transversely of and revolubly supported on said frame intermediate the front and rear wheels, and mechanism to control the position of said pan: said frame comprising side bars extending longitudinally between said front and rear wheels, a double knuckle in each bar at said pan, one joint of each of said knuckles being a stop joint to prevent downward breaking thereof, the middle sections of said knuckles having forward extensions; a revoluble bowl pan pivoted on the axes of the other joints; adjusting brace means mounted on other sections of said knuckles and connected to said extensions, power actuated means connected to said brace means to adjust the angles between the middle and said other sections of said knuckles, stops on said pan, manually operable catches on said extensions movable into and out of engaging position for said stops to limit roll-over movement of said pan, and manually operable means to position said catches in either pan releasing or holding positions.

5. A wheeled dirt moving machine comprising a frame supported by wheels at the front and rear, a pan extending transversely of and revolubly supported on said frame intermediate the front and rear wheels, and mechanism to control the position of said pan: said frame comprising side bars extending longitudinally between said front and rear wheels, a double knuckle in each bar at said pan, the rear joints of said knuckles being stop joints to prevent downward breaking thereof, the middle sections of said knuckles having forward extensions; a revoluble bowl pan pivoted on the axes of the front joints; links connected to said extensions, adjusting bell crank levers pivotally mounted on the front sections of said knuckles and connected to said links, power actuated means connected to arms of said bell crank levers to adjust their positions and thereby the angles between the middle and front sections of said knuckles, stops on said pan, manually operable catches on said extensions movable into and out of engaging position for said stops to limit roll-over movement of said pan, and manually operable means to position said catches in either pan releasing or holding positions.

In witness that I claim the foregoing I have hereunto subscribed my name this 23rd day of July, 1931.

CHARLES LE BLEU.